United States Patent [19]

Kalmanash

[11] Patent Number: 5,748,268
[45] Date of Patent: May 5, 1998

[54] QUASI-TILED ACTIVE MATRIX DISPLAY

[75] Inventor: Michael H. Kalmanash, Los Altos, Calif.

[73] Assignee: Kaiser Aerospace & Electronics Co., San Jose, Calif.

[21] Appl. No.: 413,689

[22] Filed: Mar. 30, 1995

[51] Int. Cl.⁶ .................................................. G02F 1/136
[52] U.S. Cl. ........................... 349/47; 345/90; 257/350
[58] Field of Search ............................. 359/59; 257/66, 257/350, 353, 352, 632, 635; 252/299.01; 427/538; 428/1; 345/90; 349/42–47

[56] References Cited

U.S. PATENT DOCUMENTS

| | | | |
|---|---|---|---|
| 5,403,772 | 4/1995 | Zhang et al. | 437/101 |
| 5,491,571 | 2/1996 | Williams et al. | 359/59 |
| 5,537,234 | 7/1996 | Williams et al. | 359/59 |
| 5,563,426 | 10/1996 | Zhang et al. | 257/66 |

*Primary Examiner*—Victor R. Kostak
*Attorney, Agent, or Firm*—Marvin H. Kleinberg, Arant, Kleinberg, Lerner & Ram, LLP

[57] ABSTRACT

An active matrix portion of an active matrix liquid crystal display is created by a process that fabricates silicon wafers containing a plurality of transistors in an array necessary for the display. A plurality of these wafers are aligned and affixed to a transparent substrate. All silicon other than the active circuits is removed. Transparent and conductive pads as well as vertical and horizontal driver lines are added directly onto the substrate and interconnect with the individual transistors. The resulting pixels are slightly undersize but will be in perfect alignment in rows and columns.

21 Claims, 7 Drawing Sheets

QUASI-TILED ACTIVE MATRIX DISPLAY

BACKGROUND OF THE INVENTION

1. Field of the Invention

The present invention relates generally liquid crystal displays and, more particularly to the fabrication of an active matrix liquid crystal display (AMLCD).

2. Review of the Prior Art

Active Matrix Liquid Crystal Displays (AMLCDs) are increasingly coming into use as displays for laptop and note book computers and other devices where a relatively thin, light and flat display is desired. The typical AMLCD comprises a sealed, relatively thin, transparent container (liquid crystal cell) holding liquid crystal material. On one side of the container (the active substrate) there is a matrix of relatively small (on the order of 100 microns square) pads of transparent conductive material, each representing an addressable element (pixel) of the display. Each one of the pads is connected to a variable source of voltage. The other (passive) substrate contains a uniform coating of transparent conductive material which is connected to a fixed voltage, typically ground. In addition, a polarizer is located on each side of the liquid crystal cell.

When a voltage is applied to an active pad it creates a electric field across the liquid crystal material in the gap between the active pad and the passive substrate conductive coating which is fixed at the set potential. This changes the polarization shift introduced to polarized light travelling through the affected portion of the liquid crystal cavity. This, in turn, changes the amount of light passing through the exit polarizer in the region of that pixel. Accordingly, the brightness of each pixel is controlled by the applied voltage.

A typical display screen may include some 1,000×1,000 (1,000,000) pixel pads. Multiplexing schemes make it possible to address each pad separately. Typically, each pad has an associated "pixel transistor" which permits it to store a predetermined voltage between refresh times. Each transistor drain (or source) in a column of pixel transistors is connected with a driver element through a column electrode, while its source (or drain) is connected to the pixel pad. Likewise, each transistor gate in a row of pixel transistors is connected with a driver element through a row electrode.

When a particular row is selected to be refreshed, the column drivers introduce the desired voltage levels into the column electrodes. A voltage strobe is placed across the row electrode, momentarily gating conduction between the source and drain of each transistor in that row and permitting the pixel pad of that row to charge to the applied column voltages. When the strobe is removed, the transistors become high impedance paths, effectively disconnecting the pixels from the column electrodes. The applied voltage is maintained by the pixel capacitance (plus any additional storage capacitors) until the next refresh. Alternatively, the system may be arranged so that the rows have the voltage setting elements and the strobe voltages are applied to the columns.

In a color display, the pixels are generally grouped in units of three or four. Each pixel of the group is covered by a different color filter (red, green, blue) placed on the passive substrate and aligned with the pixel pad. Such a group of pixels is sometimes referred to as a single color pixel with its individual color components referred to as "sub-pixels." For ease of discussion, however, in this text, the term pixel refers to any individually addressable pad, the smallest addressable unit on the display.

The devices which manipulate voltages on the row and column electrodes are generally known as "drivers" and are typically discrete elements, attached to the AMLCD at the periphery of the screen, outside of the visible screen area. These devices have to meet some fairly challenging requirements in terms of drive current and bandwidth in order to meet the demands of correctly setting the voltage values of all the pixels in the allotted time. When used in portable lap top or note book computers, light weight is extremely important.

Contemporary methods for creating the necessary grid of transistor switches rely on amorphous silicon (a—Si) as the semiconductor medium. This is largely because the deposition and processing of a—Si can be achieved at low temperatures which are compatible with the use of ordinary glass substrates. The operating characteristics of a—Si transistors are such that these devices can provide only limited drive current and bandwidth, due to poor device mobility. This prevents their use in row and column driver circuits and requires that these drives be packaged separately from the AMLCD and connected to it via interconnects at the display periphery. This method of assembly adds weight and bulk, and increases the fragility of the assembly. Drive interconnect density factors also limit the maximum achievable display resolution.

Alternative semiconductor media have been investigated which have higher mobility and which therefore could permit the integration of row and column drivers onto the AMLCD active substrate. Polycrystalline silicon (p—si) and single crystal silicon (x—Si) have been used in this manner, and AMLCDs with integral drivers have been demonstrated. The problem is that these devices (p—Si or x—Si transistors) can not be fabricated on glass substrates due to high temperature processing requirements. Typical p—Si AMLCDs have been made using quartz substrates, while for x—Si the active matrix arrays have been made on high temperature opaque substrates, then transferred to glass. Both of these methods are expensive and are limited to small substrate sizes.

3. Prior Art References

There are several patents which appear to have relevance. For example, the two patents granted to Wakai et al., U.S. Pat. Nos. 5,032,883 and 5,229,644; as well as U.S. Pat. No. 5,177,577, granted to Taniguchi et al.; and patent granted to Kaneko et al., U.S. Pat. No. 5,166,816, each disclose an improved thin film transistor fabricated from amorphous silicon or polysilicon. These improved transistors are built up through a series of steps on a transparent substrate.

None of these patents adequately addresses the problem of connecting these transistors with the controlling drivers which must be fabricated separately and attached to the periphery of the screen. Nor do they solve the potential problems caused by the inherent shortcomings of a—Si as a material for transistors, discussed below.

U.S. Pat. No. 5,132,821, granted to Nicholas, describes an AMLCD in which the pixel transistors are shielded by layers whose thickness is related to the color of the light to which the device is to be subjected in order to prevent photo-induced currents. However, the devices are fabricated from polycrystalline silicon or amorphous silicon.

The patent granted to Yoshimoto et al., U.S. Pat. No. 5,066,105, addresses the problem of cross-talk in LCD devices with the addition of varistor layers, rather than using TFTs. Neither of these patents address the problems noted above that, in general, hinder the fabrication of AMLCDs.

U.S. Pat. No. 5,095,306, granted to Maurice, teaches an AMLCD which can derive and display the contours of the shapes it is displaying. This reference, however, similar to the others discussed here, does not address the problems related to the transistors which are used in the addressing circuits but is concerned only with the electrode structure of the LCD cells. No consideration is given to the construction of rugged, light weight AMLCDs. Amorphous silicon material, due to its physical characteristics, can not be formed into transistors with the rapid switching times and low power characteristics that are necessary to create the "driver" elements that are located on the periphery of the screen and which feed the voltage values into the individual pixel voltage latches. This requires that the driver elements be fabricated separately.

Moreover, a discrete interconnect is required for each of the AMLCD row and column electrodes. These connections are expensive to create and, as the screen size and resolution increase, the task of making them becomes increasingly cumbersome. In addition, a great number of connections tends to make any mechanism less rugged.

The use of amorphous silicon for the pixel transistors creates two additional problems. One problem is that producing a collection of amorphous silicon transistors on a glass substrate is fundamentally different from building conventional silicon integrated circuits, and therefore a dedicated active matrix fabrication facility is needed. A large initial investment is required to build such items at a reasonable price. A company wishing to build a specialized AMLCD has the choice of setting up its own production line, a step which may require many tens of millions of dollars, or attempting to procure the item from an established producer. Understandably, an established producer is unlikely to be willing to make any expensive changes to its production arrangements for quantities that are not substantial, usually 10,000 units or more.

Another problem with the use of a—Si pixel transistors is the limited nature of these transistors. Amorphous silicon has a low electron mobility. Because of this, a wider, larger a—Si transistor is necessary to deliver the same amount of current that is available from a thinner, smaller p—Si or x—Si transistor. This limits the pixel area in high resolution a—Si AMLCDs.

Further, the capacitance of an a—Si transistor increases in relation to the width of the transistor. Therefore, given a limited drive current, the addressing time per row (to charge the pixels to the desired drive current, voltages must be increased. This translates into slower refresh times for dense, high resolution displays, potentially setting an upper limit on the number of pixels in an a—Si AMLCD.

One potential solution to this problem has been shown and described in the recently issued patent to Zavracky et al., U.S. Pat. No. 5,206,749. According to the patent, pixel transistors along with the drivers, the interconnecting electrodes and the transparent, conductive pixel electrodes are fabricated on wafers incorporating a thin film of x—Si material. These wafers are then adhered to a glass surface, and the underlying material is removed, leaving the thin x—Si circuit array attached to the glass. The glass element then forms the active substrate in an AMLCD. Several of the wafers might be assembled onto a single substrate to form a large active substrate. A second substrate would contain the common pixel electrode and color filters, completing the LC cell assembly.

These techniques are also discussed in articles by P.M. Alt and P. Pleshko in IEEE Trans. Electron Dev. ED-21, 146 (1974); J. P. Salerno, et al., SID 92 Digest, vol 23, 63 (1992); and T. Abe, et al., Extended Abstracts, Electrochemical Society Spring Meeting, vol 93-1, 1179 (1993).

Unfortunately, the ability of the human eye to perceive even very slight misalignments in the placement of pixels creates a significant problem. For example, if the border between two wafers is not precisely aligned, it can be easily perceived. Similarly, slight misalignments of rows or columns of pixels will be readily apparent. Achieving the required accuracy of wafer placement can drive up the cost of such a display to the point where it is no longer economically practical.

In addition, height or thickness differences as between adjacent wafers could cause variations in the thickness of the liquid crystal cells. This tends to cause a variation in the electro-optical characteristics of the cells as between wafers, potentially producing noticeable artifacts in the display as viewed by the user.

Accordingly, there is a need for a practical method of providing better transistors in large screen AMLCD devices. Clearly, x—Si transistors have superior performance characteristics and would be the device of choice if they could be employed at reasonable cost in large display devices that were free of the artifacts of fabrication.

SUMMARY OF THE INVENTION

According to the present invention, a plurality of pixel transistors and edge row and column driver elements, but not pixel pads or row and column electrodes are fabricated in a matrix on a wafer containing a thin film of single crystal silicon (x—Si) using conventional integrated circuit techniques. Such wafers are readily available using SIMOX or Bonded Wafer technology. In this process, the gate, source and drain of each pixel transistor are each equipped with a conductive tab for easy connection to a corresponding row and column electrode and a transparent electrode indium tin oxide ("ITO") pad.

A plurality of these wafers are then affixed to a transparent substrate, such as glass, in a matrix with the transistors generally aligned in rows and columns. Through the use of a suitable techniques, for example, photoresist and etching or a reagent, all of the silicon wafer, except for the pixel transistors, their conductive tabs and the peripheral row and column driver components is selectively removed. At the end of this step, the substrate is left with only driver circuits along an edge of the substrate and a plurality of isolated thin film transistor (TFT) devices arranged in a matrix in the approximate locations that they will occupy in the non visible areas of an AMLCD device.

For very large screens, some of the wafers will only contain TFT devices and not the driver circuits. Only the wafers which will be tiled at the edges of the display area will contain drivers. After all of the wafers have been "tiled"0 onto the substrate and all of the unneeded silicon wafer material has been removed, the substrate remains with a plurality of driver circuits arranged about the periphery and a matrix of rows and columns of individual TFT devices.

Once the matrix is created, conductive row and column electrodes and the transparent, conductive (ITO) pixel pads can be deposited directly onto the glass in a continuous (non-tiled) manner. The deposited row and column electrodes connect the driver circuits to the pads of the TFT devices and the TFT devices to the transparent pixel ITO electrodes.

Since the displayed image is formed only by the transparent pixel electrodes, and since the pixel transistors, the conductive lines and the switching circuitry are all located in areas that are not directly observable by the viewer, there is some latitude in their placement. Ultimately, they will be obscured by a "shadow mask" grid that separates the individual pixels.

Therefore, all of the elements which are visible to the viewer are, with this method, deposited directly onto the glass surface after all of the tiled single crystal silicon circuits are in place. Zavracky et al., supra, teach methods that are adequate to assure that these elements can be adhered to the glass surface with enough uniformity to avoid observable artifacts resulting from misplacement or misalignment.

In the "tiling" of the prior art, it was necessary to utilize the full area of each "tile" so that tile row and column electrodes could subsequently interconnected. This added another element of difficulty to the handling of the tiles as it meant that there were virtually no unused borders to provide a margin of safety for tile handling.

In accordance with the present invention, the individual tiles do not contain the row and column electrodes or the pixel electrodes, so that a larger tile margin area may be made available, thereby relaxing somewhat the requirements on the handling of the tiles and particularly on the methods used to remove the underlying wafer after bonding the thin film circuits to the glass substrates. The important aspect of the present invention is the ability to use single crystal silicon pixel transistors in the display along with integrated row and column drivers, providing all of the advantages of high speed with low power that make such TFT devices desirable in a portable AMLCD device without the disadvantage of having a matrix of tiled pixel electrodes which must be maintained in extremely accurate row, column and height alignment over the entire display screen.

The novel features which are characteristic of the invention, both as to structure and method of operation thereof, together with further advantages thereof, will be understood from the following description, considered in connection with the accompanying drawings, in which the preferred embodiment of the invention is illustrated by way of example. It is it be expressly understand, however, that the drawings are for the purpose of illustration and description only, and they are not intended as a definition of the limits of the invention.

DETAILED DESCRIPTION OF THE PREFERRED EMBODIMENT

Figure 1:
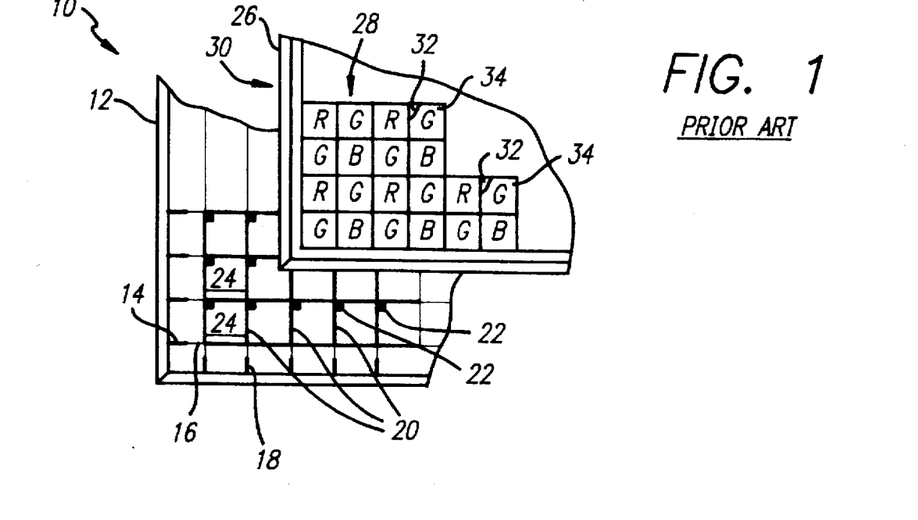
FIG. 1 is a perspective, exploded view of a portion of a prior art active matrix liquid crystal display (AMLCD)

Turning first to FIG. 1 there is shown in an exploded perspective view, an active matrix liquid crystal display (AMLCD) 10. As illustrated, there is a first layer 12 which includes the row drivers 14, the row conductors 16, the column drivers 18, the column conductors 20, the pixel thin film transistors (TFT's) 22 and the transparent pixel electrodes 24.

On a second layer 26, which overlies the first layer 12, there is a conductive transparent electrode and a plurality of pixel cells 28, subdivided into subpixels 30, each including a colored filter 34 of a primary color. Generally, three or four primary color subpixels 30 make up a single pixel cell 28. A "quad" (four subpixel) mosaic is illustrated, containing two green, one red and one blue subpixel per full color pixel. A suitable liquid crystal material is contained between the two substrates 12, 26.

Figure 2:
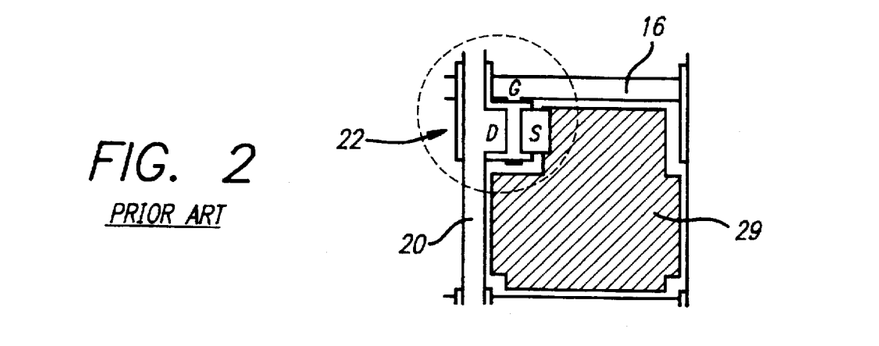
FIG. 2 is a simplified electrical diagram of an enlarged portion of the AMLCD of FIG. 1.

FIG. 2 shows, in slightly greater detail, the electrical interconnections at the subpixel 30 level. A plurality of individual pixel TFT devices 22 are shown. One of the source and drain electrodes of each TFT 22 is connected to a column conductor 20, and the other is connected to a pixel electrode 24. The gate of each TFT 22 is connected to a row conductor 16. The liquid crystal material forms a capacitor 32 between the pixel electrode 24 and the common electrode of the passive substrate, here indicated by the ground symbol.

Figure 3:
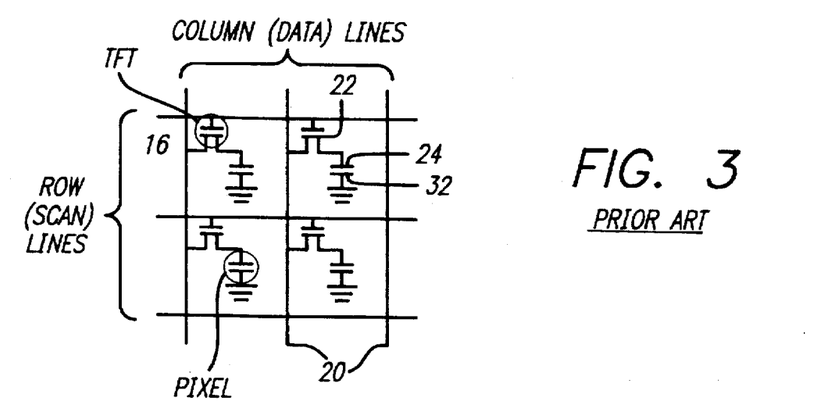
FIG. 3 is an electrical schematic diagram of the portion of the AMLCD shown in FIG. 1.

FIG. 3 is an electrical schematic diagram of the portion of the AMLCD shown in FIG. 1. This figure shows the elements shown before but as their electronic schematic symbols.

Depending upon the design of the AMLCD device, a subpixel that has a potential drop between its electrodes will either transmit or block light. Adopting the convention that increasing the voltage applied across the electrodes of a subpixel (i.e. the voltage between the common electrode and the subpixel active electrode) will increase its transmission of light, then to cause an individual subpixel to transmit light, its column conductor 20 must have a voltage applied to it by its column driver 18. Those subpixels that are to remain dark do not have a voltage applied by the respective column conductors. This convention corresponds to a parallel orientation of the polarizers applied to the LC cell.

Each of the row conductors 16 are sequentially given a small voltage pulse by the row drivers 14 which renders the TFTs of that row conductive, and providing the voltage applied by the respective column conductor 20 across the electrodes of the selected subpixels. Upon removal of the pulse, the TFTs of that row are rendered non-conductive, permitting the previously applied voltage to remain until the next cycle, at which time the row driver 14 is again pulsed, this time with newly selected column drivers 18 energized at the updated voltage levels.

In operation, the subpixel data for a given row is applied to each column conductor. The appropriate row voltage is applied, closing all of the TFT switches in that row, thereby applying the column voltages to the selected subpixel electrodes of that row. The row voltage is then removed, decoupling the row of subpixels from the column conductors.

The process is then repeated for the next and subsequent rows until all of the rows have been addressed. As a result, the entire screen will provide a complete display for that interval and the process repeats for the next interval. The inherent capacitance of the individual liquid crystal cells at each subpixel maintains the voltage on the energized subpixels until the next cycle, applies the updated voltage corresponding to the desired transmittance or gray shade level.

An equivalent result could, of course, be achieved in an alternative embodiment in which the transistor gates connect to column conductors 20 and the drains connect to row conductors 16. Placing the pixel voltages on the row drivers and the strobes on the column drivers would then achieve an equivalent result in that sequentially strobing the columns would ultimately energize each selected pixel.

Another equivalent, alternative embodiment would be to attach the driver lines, which establish the pixel voltages (the column driver lines in this example) to the transistor source rather than to the transistor drain. The present invention is intended to encompass all the different combinations of drivers and transistor terminals in order to selectively energize chosen pixels of the array.

In what appears to be the most relevant prior art, the reference to Zavracky et al., a thin film single crystal silicon wafer is fabricated with a complete matrix of the first layer, including the row drivers and conductors, the column drivers and conductors, the TFT devices and the pixel electrodes, all fabricated from single crystal silicon (x—Si) in a single integrated circuit.

Figure 4A:
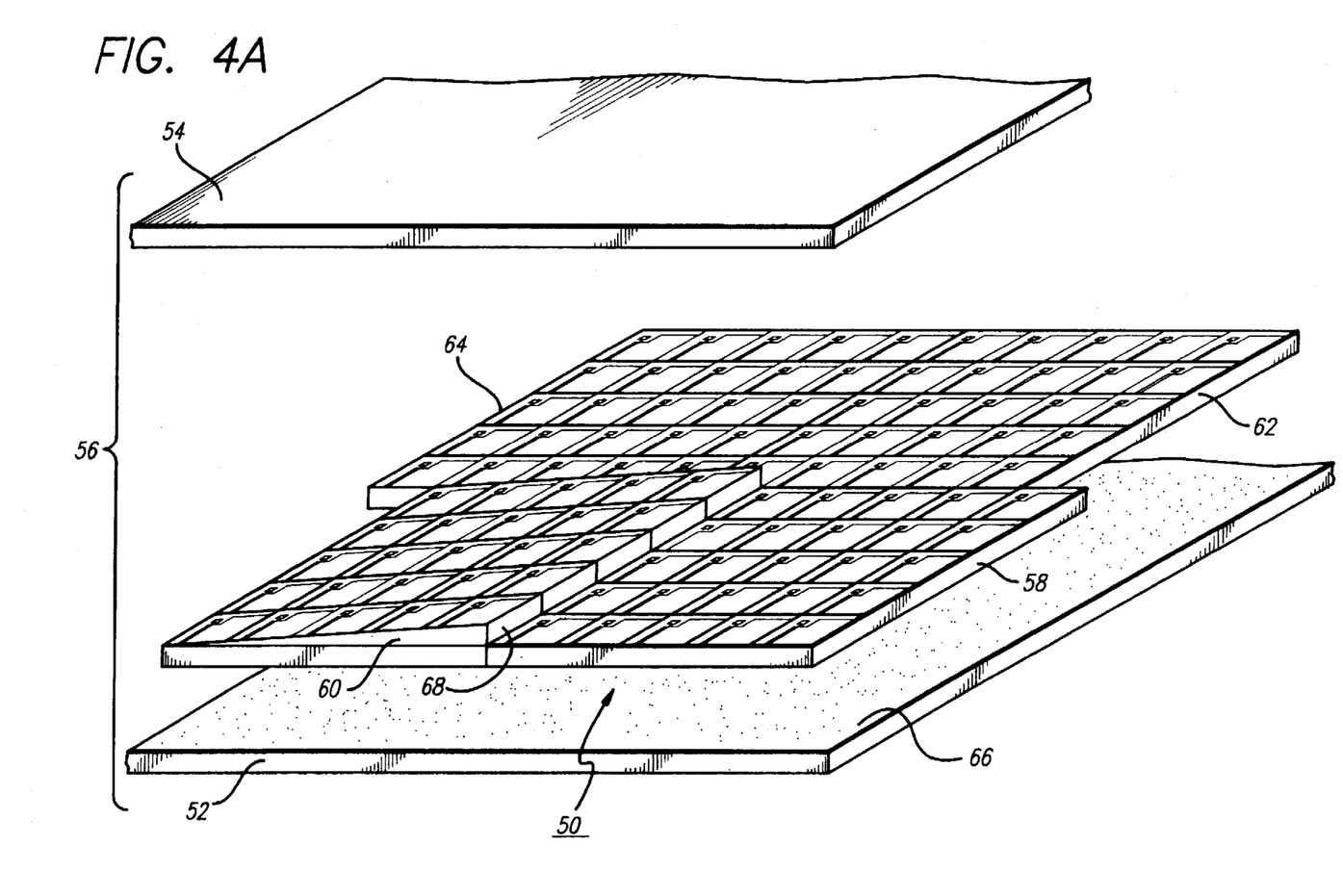
FIG. 4a is a perspective view of a set of wafers tiled together as in the prior art.

FIG. 4a is a cross-sectional perspective view of a liquid crystal cell 50. This drawing illustrates the problems with inconsistent "depth" displacement that arise when a plurality of these integrated circuits are "tiled" together on a glass substrate to form a screen whose overall dimensions are greater than the dimensions of a single wafer.

The liquid crystal cell 50 is comprised of an active substrate 52 and a passive substrate 54. The gap 56 between these two substrates 52, 54 is typically on the order of 5 microns. To the interior side of the active substrate 52 are attached a first, second, third and fourth wafer 58, 60, 62 and 64 respectively. Each wafer is fixed to the active substrate 52 with a layer of glue 66. A varying thickness of glue will cause a vertical or depth misregistration 68, such as that shown between the first 58 and second 60 wafers.

As the gap between the active 52 and passive 54 substrates is only 5 microns thick, even a slight misregistration may be observable as a sudden shift between light and dark on the screen.

Figure 4B:
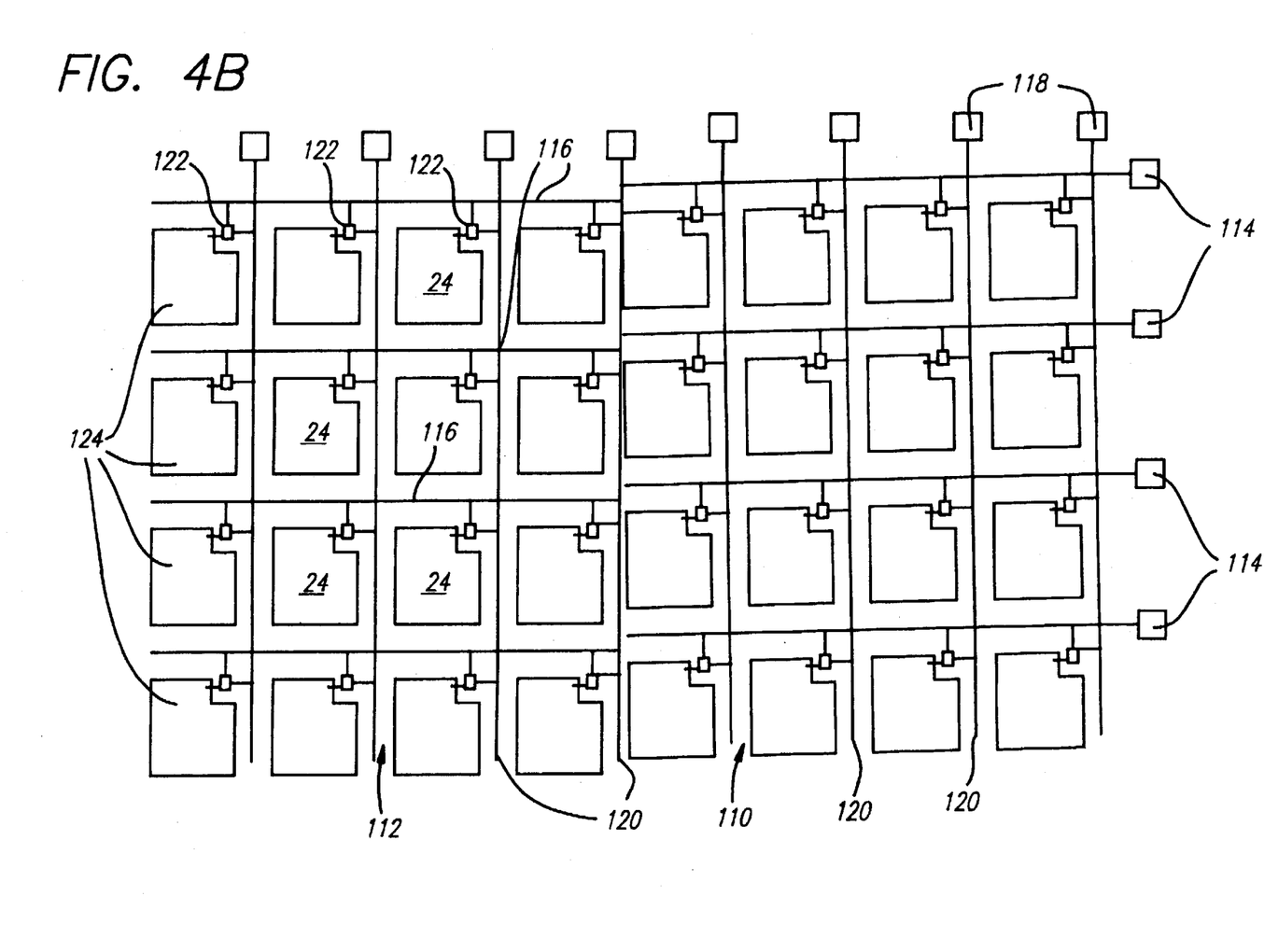
FIG. 4b is a simplified electrical diagram showing two wafers tiled together as in the prior art.

Although the vertical misalignment of the wafers is exaggerated for purposes of illustration, in reality, even slight misalignments are apparent and are distracting to the viewer. Accordingly, an inordinate effort must be expended to prevent misalignments FIG. 4b is a simplified electrical diagram of a first 110 and second 112 wafer which are mutually adjacent. The parts are labelled here in the same manner as in FIG. 1, but with 100 added to each number. These include horizontal driver circuits 114, horizontal driver lines 116, vertical driver circuits 118, vertical driver lines 120, pixel transistors 122 and pixel electrodes 124. Note that due to an error in placing these two wafers 110, 112 in adjacency the pixel electrodes are misaligned. Although this misalignment is exaggerated, the human eye is very sensitive to columns of pixels which are not parallel. Great care must be taken to avoid even small misregistrations.

Figure 5A:
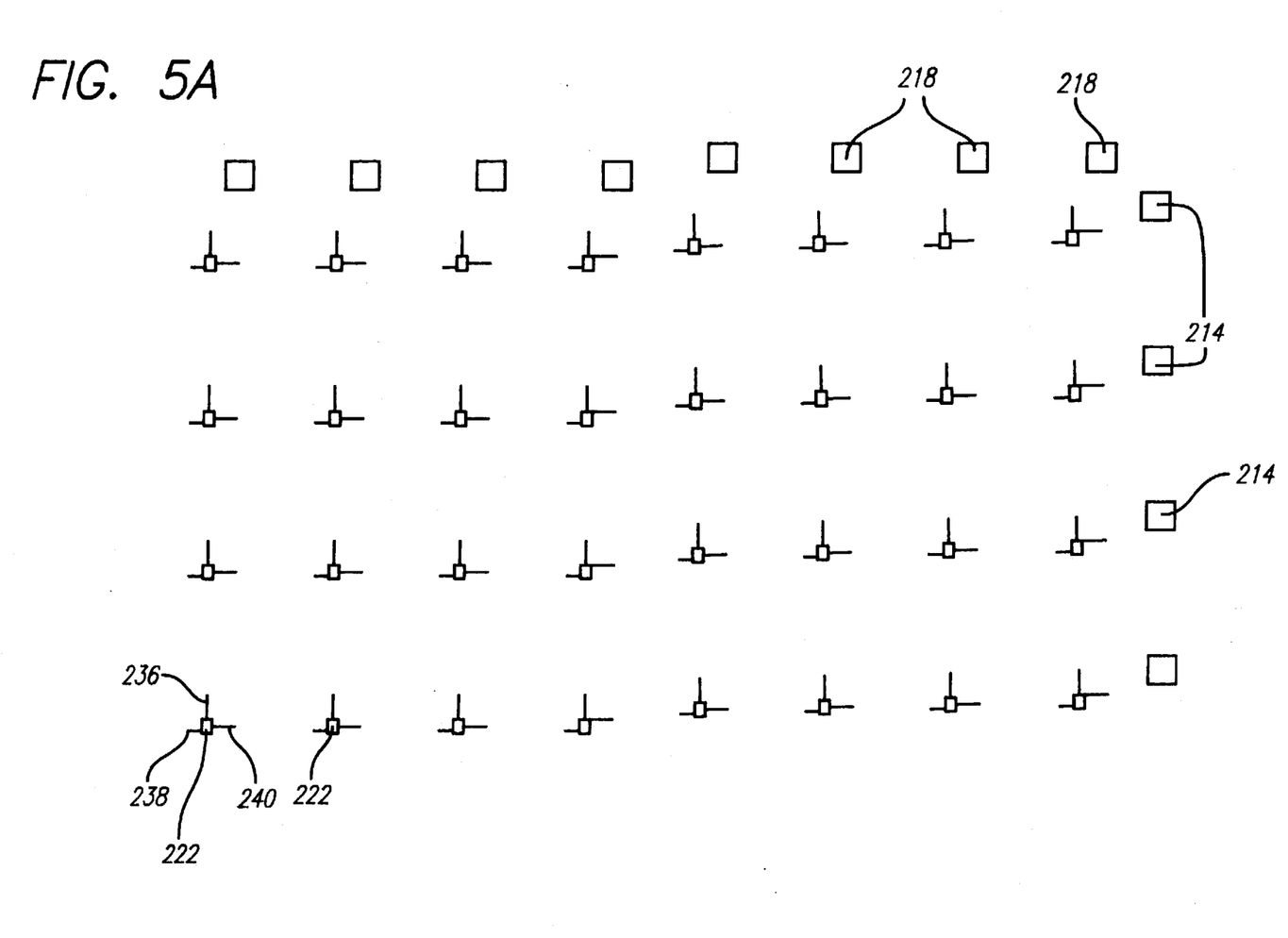
FIG. 5a is a simplified electrical diagram of two wafers tiled together, after the removal of unwanted material, as in the preferred embodiment of the present invention.

FIG. 5a is a simplified electrical diagram showing the result of placing a first 210 and second 212 wafers, in adjacency and washing off all material other than the horizontal and vertical driver circuits 214, 218 respectively and pixel transistors 222 and the associated horizontal driver line tabs 236, pixel electrode tabs 238 and vertical driver line tabs 240. Note that there is an angular and vertical misregistration between the remaining wafer components. For each wafer, 210, 212 all of these components have been fabricated on a single crystal silicon (x—Si) thin film wafer so that the active circuit elements can be easily separated from the supporting substrate, which is unaltered layered semiconductor material.

Figure 5B:
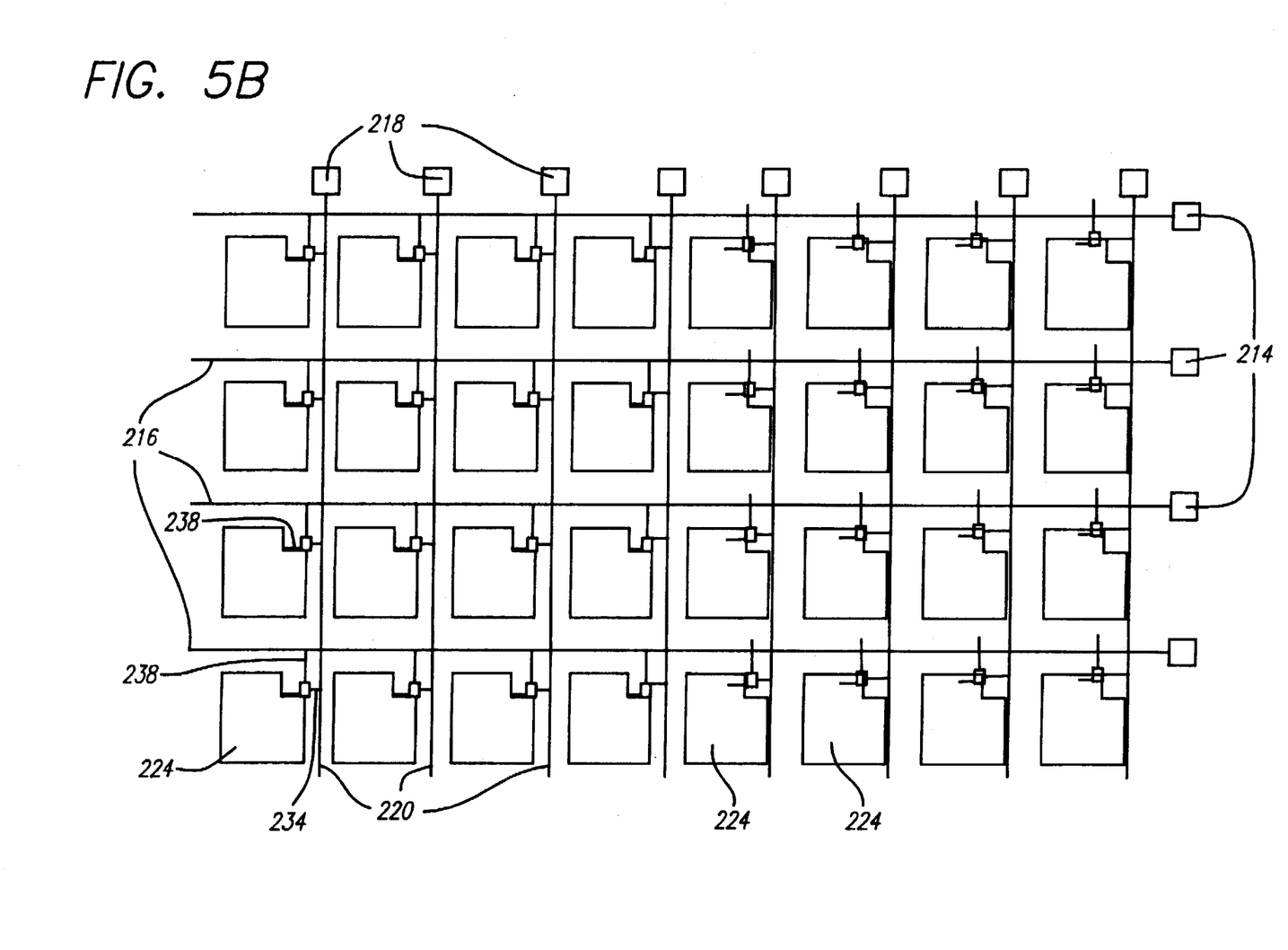
FIG. 5b is a simplified electrical diagram of two wafers tiled together, after fabrication of electric row and column driver lines and pixel electrodes, as in the preferred embodiment of the present invention.

FIG. 5b shows this same circuit after horizontal driver lines 216, vertical driver lines 220 and pixel electrodes 224 have been added. Note that although there was a severe misregistration between the two wafers, the pixel electrodes 224 are evenly spaced in a seamless matrix.

It is the placement of the ITO pixel electrodes 224 which is effectively visible to the viewer. Since the pixel electrodes 224 are deposited in one operation over the entire surface of the transparent substrate, the proper alignment of the electrodes is controlled and they will create perfectly straight rows and columns of pixels. Accordingly, the final display appearance is unaffected by any misalignment of the wafers.

Figure 6A:
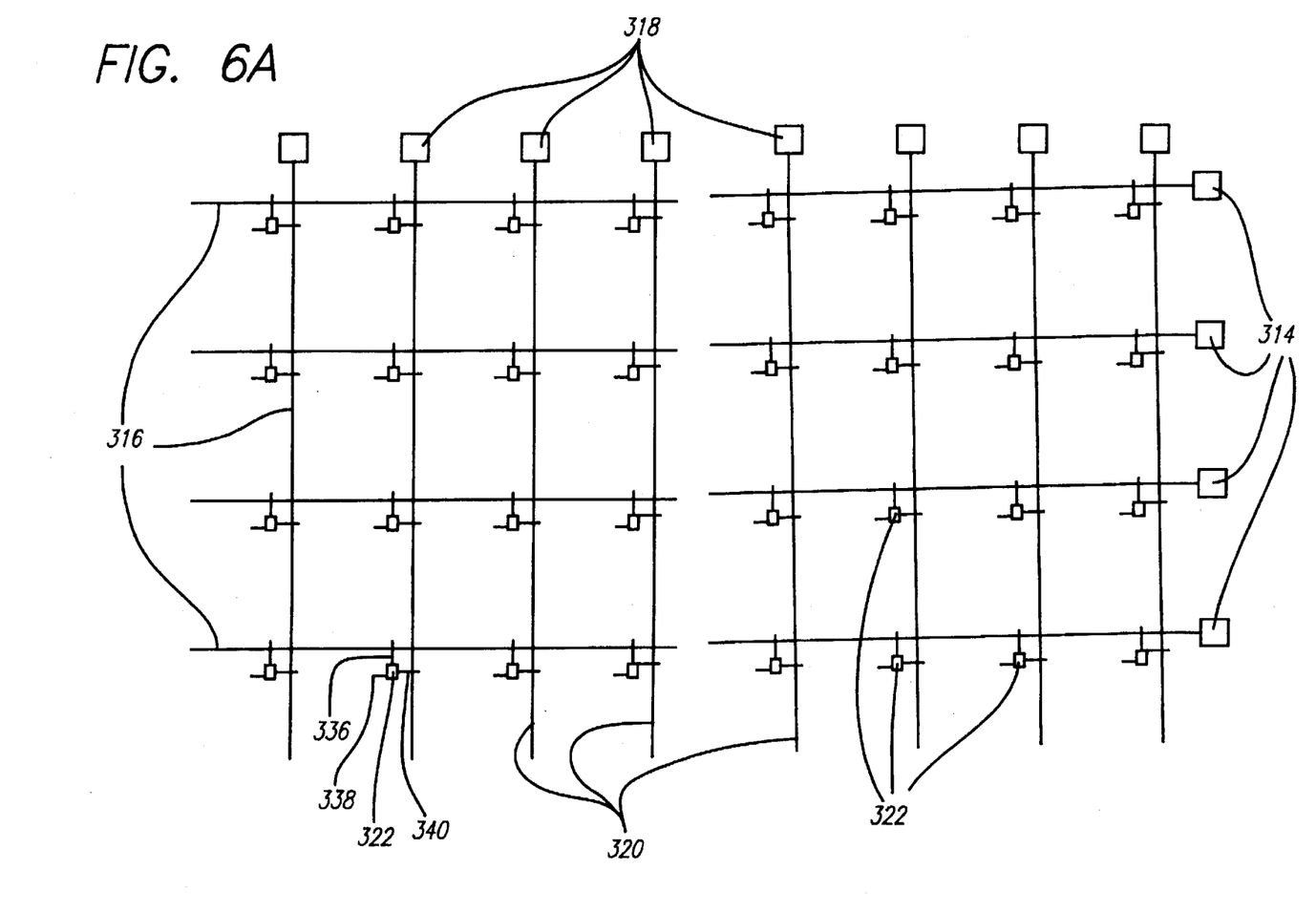
FIG. 6a is a simplified electrical diagram of two wafers tiled together, after the removal of unwanted material, as in an alternative embodiment of the present invention.

FIG. 6a is a simplified electrical diagram showing the result of placing two wafers in adjacency and washing off all material other than the horizontal and vertical driver circuits 314, 318 respectively, the horizontal and vertical driver lines 316 and 320 respectively and pixel transistors 322 and the associated horizontal driver line tabs 336, pixel electrode tabs 338 and vertical driver line tabs 340.

Figure 6B:
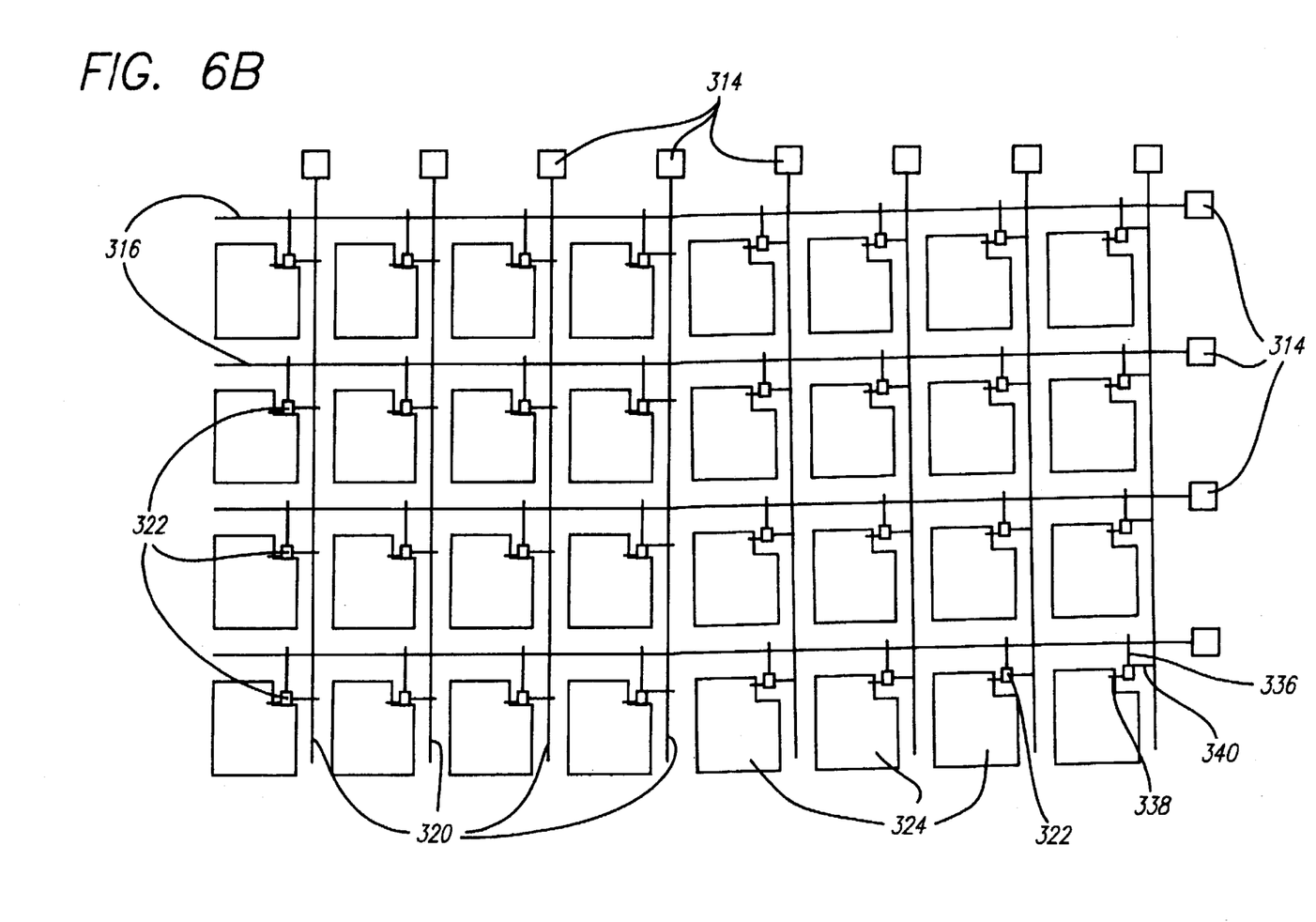
FIG. 6b is a simplified electrical diagram of two wafers tiled together, after fabrication of pixel electrodes, as in an alternative embodiment of the present invention.

FIG. 6b shows this same circuit after the pixel electrodes 324 have been added. The advantage of this technique as opposed to the technique illustrated in FIG. 5 is that the driver lines 316, 320 to pixel tabs 336, 340 connections may be made while the wafers are being fabricated. It is likely that these connections may be more easily and more durably formed in the wafer fabrication environment. The drawback of this technique as opposed to that of FIG. 5 is that the driver lines must be connected from wafer to wafer.

The remainder of the process for producing an AMLCD is well known in the art and is not a part of the present invention.

Thus, there has been shown a novel process for creating a large AMLCD display which can utilize x—Si transistor and driver circuits. Because the x—Si elements are created in a first process employing thin film silicon which can be removed from the fabrication substrate and transferred to a transparent glass substrate, the higher quality x—Si elements are available for the display.

Further, because the x—Si elements are then selectively left in place after all of the other transferred material is removed, the conductive interconnections and the transparent pixel electrodes can be later added to the glass substrate in perfect alignment. The x—Si elements are located in parts of the display that are not normally visible to the viewer and are covered or masked by a corresponding "black matrix" on the passive LC cell substrate.

Contrary to prior art techniques, the pixel electrodes are not fabricated with the TFT devices and the driver circuits which control them, but rather, are deposited on the glass substrate afterwards, as are all of the conductive paths which interconnect all of the electrical devices of the system.

Accordingly, the scope of the invention should be limited only by the scope of the claim appended hereto.

What is claimed as new is:

1. An improved method for fabricating an Active Matrix Liquid Crystal display device, said method including the steps of:

a. fabricating on a first single crystal silicon film wafer, circuits comprising individual pixel transistors arranged in a predetermined orthogonal matrix array of rows and columns, each of said pixel transistors including a gate, a source and a drain and tabs respectively connected to each;

b. bonding said wafer to a preselected area of a transparent substrate;

c. selectively removing all of said wafer from said substrate except for said pixel transistors and said conductive tabs;

d. depositing conductive column driver lines each interconnecting all corresponding pixel transistor conducting tabs on said substrate in the corresponding column so that each column line contacts an appropriate conductive tab of every transistor in the column;

e. depositing row driver lines each interconnecting all corresponding pixel transistor conducting tabs on said substrate in the corresponding row so that each row line contacts an appropriate conductive tab of every transistor in the row; and f. depositing transparent and conductive pixel electrodes on said substrate in an orthogonal matrix, each said electrode being in contact with one of said conductive tabs of a corresponding pixel transistor;

whereby the placement of pixel transistors and conductive lines is out of the viewing area allocated by the AMLCD display, said viewing area being defined by said pixel electrode areas.

2. The method of claim 1 further including the step of fabricating, from a second single crystal silicon film wafer, individual row and column driver elements with said driver elements located along peripheral edges of said wafer, as well as individual pixel transistors aligned in an orthogonal array with said row and column driver elements, said selective removal step retaining said individual row and driver elements along the peripheral edges of said substrate, said depositing steps interconnecting each of said row and column driver lines with a corresponding driver element and with the pixel transistors of said second wafer.

3. The method of claim 2, wherein said bonding step includes bonding a plurality of first and second wafers on said substrate arranged in an orthogonal array with said driver elements arranged along peripheral edges of said substrate and wherein said depositing steps further include interconnecting each row driver output with all of the pixel transistors of all of said wafers in that row and each column driver output with all of the pixel transistors of all of said wafers in that column, whereby every pixel transistor on said substrate is connected to a pixel electrode, a row driver and a column driver.

4. The method of claim 2 wherein a plurality of similar first wafers and second wafers are arranged in a matrix on a transparent substrate with each row and column of pixel transistors on one wafer being substantially aligned with the corresponding rows and columns of pixel transistors on adjacent wafers and with said second wafers forming the periphery of the display and with said first wafers comprising the interior of the display, the depositing steps further including interconnecting each row driver output with all of said pixel transistors of all of said first and second wafers in that row and each column driver output with all of said pixel transistors of all of said first and second wafers in that column, whereby every pixel transistor is connected to a row driver and a column driver.

5. The method of claim 4, wherein the depositing steps further include placing a pixel electrode on said transparent substrate adjacent each pixel transistor with all of said pixel electrodes being aligned in rows and columns independent of any original misalignment of said first and second wafers on said transparent substrate.

6. The method of claim 1 wherein said depositing steps include the application of indium tin oxide to form said transparent and conductive pads.

7. The method of claim 1 wherein said first and second wafers are comprised of various layers of single crystal silicon, dielectrics and metallization to form active electronic circuits.

8. The method of claim 1 wherein said transparent substrate is glass.

9. The method of claim 2 wherein said first and second wafers are fixed onto said transparent substrate through the use of an adhesive.

10. The method of claim 2 wherein said first wafers have blank peripheral margins for ease of handling.

11. The process of claim 1 further including the step of fabricating, on a different single crystal silicon film wafer, circuits substantially identical to said first wafer circuits, comprising individual pixel transistors arranged in an orthogonal matrix array of rows and columns aligned with said predetermined matrix array, each of said pixel transistors including a gate, a source and a drain and tabs respectively connected to each, and in which the bonding step includes bonding said different wafer to a different preselected area of said transparent substrate and the step of selectively removing all of said wafer includes removing all of said different wafer except for the pixel transistors contained thereon.

12. An improved method for fabricating an Active Matrix Liquid Crystal display with a periphery, said method including the steps of:

a) producing a set of wafers through standard integrated circuit production techniques, said wafers collectively comprising row and column driver elements and pixel transistors connected through conductive driver lines, wherein said driver elements are to be located along the display periphery for applying voltages to said pixel transistors, said pixel transistors being arranged in a predetermined orthogonal matrix and each said transistor including a gate, a source and a drain, each of which includes an outwardly extending conductive tab for connecting to other elements;

b) bonding said wafers, each in horizontal and vertical proximity with others of said wafers, onto a transparent substrate;

c) removing all those portions of said wafers which are neither a pixel transistor, a driver element nor a driver line;

d) depositing a transparent and conductive pad for each transistor so that said pad contacts an appropriate conductive tab of said transistor;

e) connective said driver lines from one wafer to another so that each column driver line runs the length of an entire display column;

f) connecting said row driver lines from one wafer to another so that each row driver line runs the length of an entire display row.

13. The method of claim 12 wherein said transparent and conductive pads are made of indium tin oxide.

14. The method of claim 12 wherein said integrated wafers are comprised of various layers of single crystal silicon.

15. The method of claim 12 wherein said transparent substrate is glass.

16. The method of claim 12 wherein said wafers are bonded onto said transparent substrate through the use of an adhesive.

17. The method of claim 12 wherein said wafers have blank margins for ease of handling.

18. An improved method for fabricating an Active Matrix Liquid Crystal display (AMLCD) device, said method including the steps of:
   a. fabricating on a first single crystal silicon film wafer, circuits comprising individual pixel transistors arranged in a predetermined orthogonal matrix array of rows and columns, each of said pixel transistors including a gate, a source and a drain and tabs respectively connected to each;
   b. fabricating, on a different single crystal silicon film wafer, circuits comprising individual pixel transistors arranged in an orthogonal matrix array of rows and columns aligned with said predetermined matrix array, each of said pixel transistors including a gate, a source and a drain and tabs respectively connected to each;
   c. bonding said wafers to preselected areas of a transparent substrate;
   d. selectively removing all of said wafers from said substrate except for said pixel transistors and said conductive tabs;
   e. depositing conductive column driver lines each interconnecting all corresponding pixel transistor conducting tabs on said substrate in the corresponding column so that each column line contacts an appropriate conductive tab of every transistor in the column;
   f. depositing row driver lines each interconnecting all corresponding pixel transistor conducting tabs on said substrate in the corresponding row so that each row line contacts an appropriate conductive tab of every transistor in the row; and
   g. depositing transparent and conductive pixel electrodes on said substrate in an orthogonal matrix, each said electrode being in contact with one of said conductive tabs of a corresponding pixel transistor;
whereby the placement of pixel transistors and conductive lines is out of the viewing area allocated by the AMLCD display, said viewing area being defined by said pixel electrode areas and whereby the pixel electrodes connected to said first wafer elements are aligned with the pixel electrodes connected to said different wafer elements.

19. The method of claim 18 further including the step of fabricating, from a second single crystal silicon film wafer, individual row and column driver elements with said drive elements located along peripheral edges of said wafer, as well as individual pixel transistors aligned in an orthogonal array with said row and column driver elements, said selective removal step retaining said individual row and driver elements along the peripheral edges of said substrate, said depositing steps interconnecting each of said row and column driver lines with a corresponding driver element and with the pixel transistors of said second wafer.

20. The method of claim 19, wherein said bonding step includes bonding a plurality of first, different and second wafers on said substrate arranged in an orthogonal array with said driver elements arranged along peripheral edges of said substrate and wherein said depositing steps further include interconnecting each row driver output with all of the pixel transistors of all of said wafers in that row and each column driver output with all of the pixel transistors of all of said wafers in that column, whereby every pixel transistor on said substrate is connected to a pixel electrode, a row driver and a column driver.

21. The method of claim 19 wherein a first plurality of similar first and different wafers and a second plurality of second wafers are arranged in a matrix on a transparent substrate with each row and column of pixel transistors on one wafer being substantially aligned with the corresponding rows and columns of pixel transistors on adjacent wafers and with said second wafers forming the periphery of the display and with said first and different wafers comprising the interior of the display, the depositing steps further including interconnecting each row driver output with all of said pixel transistors of all of said first, different and second wafers in that row and each column driver output with all of said pixel transistors of all of said first, different and second wafers in that column, whereby every pixel transistor is connected to a row driver and a column driver.

* * * * *